F. A. MORLEY.
Potato Digger.
No. 84,297.
Patented Nov. 24, 1868.
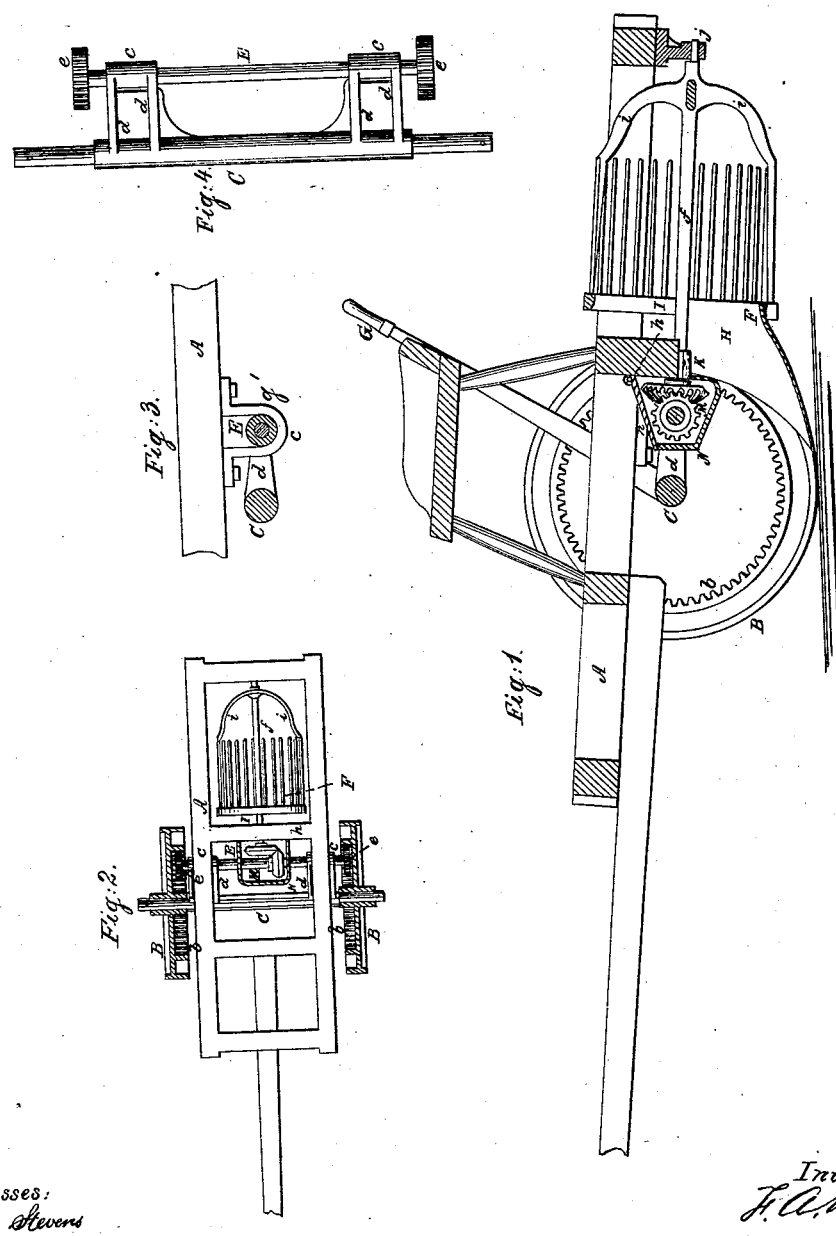

F. A. MORLEY, OF SYRACUSE, NEW YORK.

Letters Patent No. 84,297, dated November 24, 1868.

IMPROVEMENT IN POTATO-DIGGERS.

The Schedule referred to in these Letters Patent and making part of the same.

*To all whom it may concern:*

Be it known that I, F. A. MORLEY, of Syracuse, in the county of Onondaga, and State of New York, have invented a new and useful Improvement in Potato-Diggers; and I do hereby declare that the following is a full, clear, and exact description thereof, which will enable those skilled in the art to make and use the same, reference being had to the accompanying drawings, forming part of this specification, in which—

Figure 1 is a vertical longitudinal section of my invention, and

Figure 2 is a sectional plan view of the same.

Figures 3 and 4 are detail views.

Similar letters of reference indicate like parts in all the figures.

The frame A is mounted on two wheels, B B, which turn loosely on the axle C.

The axle C is made straight, as shown in fig. 4, but has boxes, $c\ c$, extended from its rear side by arms $d\ d$, for holding the driving-shaft E.

On the ends of shaft E are pinions, $e\ e$, which engage with the internal gears $b\ b$ of the wheels B B, to drive the rotating screen or riddle F, as shown in fig. 2. The boxes $c\ c$ act also as wrists, for supporting the frame A, the said wrists $c$ being held in boxes $g$, fig. 3, which are attached to the lower side of frame A, so that, by turning the axle C, by means of a hand-lever, G, the wrists $c$ are thrown upward or lowered, and the frame A is elevated or depressed, and by this means the digging-devices, which are attached to the frame A, are lowered or raised, as desired.

H is a shovel-plow, which is rigidly secured to the cross-beam $h$.

F is a rotary screen, which consists of a central spindle, $f$, the forward end of which is held in a box or bearing, $k$, and the rear end in a bearing, $j$, fig. 1, having arms, $i$, on its rear end, which project forward, and sustain a ring, I, which bears a sufficient number of slats or rods to form a cylindrical screen or riddle. In this manner, the riddling-cylinder is so constructed that it is supported by a single set of arms, located somewhat in the rear of the cylinder, and there are no arms within said cylinder to obstruct its action.

Connection is made between the spindle $f$ and the driving-shaft E by means of bevel-gears M, which work within a box, N, to secure them from dirt, vines, &c., the box being accessible by a cover, $n$, fig. 1.

The depth of the digging is regulated entirely by the lever or handle G, and is operated by the driver in his seat. By means of this lever, the plow and screen are also elevated or thrown up, for clearing obstructions, for turning around, and for transportation from field to field.

A suitable rack is provided, for holding the lever G at different points of its stroke, so that the depth of digging can be regulated to suit circumstances.

As the machine is drawn forward, the dirt containing the potatoes is forced up over the plow H, and into the screen F, and the rotative motion of the screen causes the dirt to pass between the slats, while the potatoes are retained and discharged from its rear end, so as to be left on the surface of the ground.

If the vines lodge on the arms $i$ to an objectionable extent, then fingers or knives can be arranged on the frame A, to pull them off, or cut them, as the motion of the screen carries them around, and in this manner vines enough to obstruct its action cannot accumulate on said arms.

The weight of the frame A rests wholly upon the exterior surface of the wrists $c$, and the shaft E works within these wrists with the friction caused by the driving-strain only.

Having thus described my invention,

What I claim as new, and desire to secure by Letters Patent, is—

1. A rotating cylinder, I F, sustained wholly by a central spindle, $f$, with arms $i\ i$, only, which are projected from the said spindle considerably in the rear of the screen F, when combined with the shovel H, as herein shown, and for the purpose described.

2. A crank-axle, C $c$, having a driving-shaft, E, working through the centre of its crank-wrists $c\ c$, as shown in fig. 4, in connection with the driving-wheels B B, frame A $g$, and screen F, all constructed and operating substantially as and for the purpose set forth.

F. A. MORLEY.

Witnesses:
SAML. DUNCAN,
W. DUNCAN.